(12) United States Patent
Legras (10) Patent No.: US 8,232,525 B2
(45) Date of Patent: Jul. 31, 2012

(54) DEVICE FOR THE DETECTION OF AN ELECTROMAGNETIC RADIATION AND ELECTROMAGNETIC RADIATION DETECTOR COMPRISING SUCH DEVICES

(75) Inventor: Olivier Legras, Voiron (FR)

(73) Assignee: ULIS, Veurey Voroize (FR)

( * ) Notice: Subject to any disclaimer, the term of this patent is extended or adjusted under 35 U.S.C. 154(b) by 343 days.

(21) Appl. No.: 12/638,006

(22) Filed: Dec. 15, 2009

(65) Prior Publication Data

US 2010/0181485 A1 Jul. 22, 2010

(30) Foreign Application Priority Data

Jan. 19, 2009 (FR) ...................................... 09 50303

(51) Int. Cl.
*G01J 5/00* (2006.01)
(52) U.S. Cl. ................................................... 250/338.3
(58) Field of Classification Search .................. 250/338.3
See application file for complete search history.

(56) References Cited

U.S. PATENT DOCUMENTS

| | | | |
|---|---|---|---|
| 5,756,999 A * | 5/1998 | Parrish et al. ................. | 250/332 |
| 6,791,085 B2 * | 9/2004 | Martin et al. ................. | 250/338.1 |
| 2002/0074499 A1 * | 6/2002 | Butler ........................ | 250/338.1 |
| 2003/0160171 A1 * | 8/2003 | Parrish et al. ............. | 250/338.1 |
| 2009/0008556 A1 * | 1/2009 | Dupont et al. ............. | 250/338.1 |

FOREIGN PATENT DOCUMENTS

| | | |
|---|---|---|
| EP | 1 211 888 A1 | 6/2002 |
| EP | 2 012 101 A1 | 1/2009 |

OTHER PUBLICATIONS

Yutaka Tanaka et al., "Performance of 320×240 Uncooled Bolometer-Type Infrared Focal Plane Arrays," Infrared Technology and Applications XXIX, Proceedings of SPIE, vol. 5074, Oct. 2003, pp. 414-424.

* cited by examiner

*Primary Examiner* — David Porta
*Assistant Examiner* — Hugh H Maupin
(74) *Attorney, Agent, or Firm* — Burr & Brown (57) ABSTRACT

The invention relates to a device for the detection of an electromagnetic radiation including: a substrate; a resistive imaging bolometer; a circuit for polarizing the bolometer at a predetermined voltage; a rejection circuit generating a common mode current, comprising a compensation bolometer thermalized in the substrate and a polarization circuit thereof; and a measuring circuit for measuring the difference between the current flowing in the imaging bolometer when it is polarized and the common mode current generated by the rejection circuit. According to the invention, the rejection circuit further comprises a current generator capable of producing a current that simulates the current induced by the self-heating of the imaging bolometer under the effect of its polarization, the sum of the current passing through the compensation bolometer and the current generated by the current generator forming the common mode current.

12 Claims, 4 Drawing Sheets

DEVICE FOR THE DETECTION OF AN ELECTROMAGNETIC RADIATION AND ELECTROMAGNETIC RADIATION DETECTOR COMPRISING SUCH DEVICES

FIELD OF THE INVENTION

The invention relates to the field of infrared imaging and pyrometry. To be more specific, the invention relates to common mode rejection when reading bolometers.

BACKGROUND OF THE INVENTION

In the field of infrared detectors, there is a known technique of using devices arranged in the form of an array, and capable of operating at ambient temperature, in other words not needing to be cooled to very low temperatures, contrary to the imaging devices known as "quantum detectors", which, for their part, require an operation at very low temperature, and typically that of liquid nitrogen.

These uncooled detectors traditionally use the variation in a physical quantity of an appropriate material, as a function of the temperature, in the vicinity of 300K. In the case of bolometric detectors, this physical quantity is the electrical resistivity.

An uncooled detector of this kind generally associates:
means for absorbing the infrared radiation and converting it into heat,
means for thermally insulating the detector, so as to enable it to heat up under the effect of the infrared radiation,
thermometry means which, in the context of a bolometric detector, implement a resistive element, formed from electrodes and a sensitive, so-called bolometric, material,
means for reading the electrical signals supplied by the thermometry means.

The radiation absorption and thermometry means are integrated into a membrane suspended by the thermal insulation means above a substrate in which are placed the read means.

Detectors intended for infrared imaging are conventionally produced in the form of an array of elementary detectors in accordance with one or two dimensions, said array being formed in the manner known as "monolithic" or carried over to the substrate, generally made of silicon, in which are constituted means for the sequential addressing of the elementary detectors, and means for the electrical excitation and preprocessing of the electrical signals formed from said elementary detectors. Said substrate and the integrated means are commonly denoted by the term "read circuit".

To obtain a scene via said detector, the scene is projected through a suitable optic onto the elementary detector array, and timed electric stimuli are applied via the read circuit to each of the elementary detectors, or to each row of such detectors, in order to obtain an electric signal constituting the image of the temperature reached by each of said elementary detectors. Said signal is processed in a more or less elaborate way by the read circuit, and then possibly by an electronic device external to the casing in order to generate the thermal image of the scene observed.

The main difficulty in employing bolometric detectors lies in the very slight relative variation of their electrical resistance, representing local variations in temperature of an observed scene, relative to the mean value of these resistances.

Indeed, the physical laws of thermal emission in the infrared of the observed scene, and typically between 8 and 14 micrometers (corresponding to the transparency band of the Earth's atmosphere in which bolometric detectors are generally used), lead to a differential power dP in the detector focal plane of the order of 50 $\mu W/cm^2$ when the scene temperature varies by 1K around 300K. The determination of this value is easily within the scope of the person skilled in the art, by applying the aforementioned physical laws.

This estimation is valid for an optic with an aperture of f/1, a high transmission between the scene and the detector, and when the detector receives only a negligible quantity of energy outside the band of specified wavelength, for example and typically if the casing is fitted with a window that is transparent in this interval and opaque below and beyond the limits indicated.

As a corollary, the temperature variation $d\theta$ of a bolometer in thermal equilibrium, related to an infrared power $dP$ absorbed on its surface S is given by the following expression:

$$d\theta = R_{th} \cdot dP \quad (1)$$

where $R_{th}$, is a thermal resistance between the sensitive part of the bolometer, which heats up under the effect of the infrared radiation, and the isothermal substrate which carries it.

Thus, for a bolometer with typical dimensions of the order of 30 $\mu m \times 30$ $\mu m$, which represents a surface of $9 \cdot 10^{-6}$ $cm^2$, the typical thermal resistance as set forth in the prior art, is of the order of 20 to 60 MK/W, which causes the bolometer to heat up by about 0.01 K to 0.03 K when the temperature of the scene element seen by the bolometer varies by 1 K.

If $R_b$ denotes the electrical resistance seen between the two current lead poles in the sensitive bolometric material, the resulting resistance variation $dR_b$ is expressed by the following expression:

$$dR_b = R_b \cdot TCR \cdot d\theta \quad (2)$$

where TCR is a coefficient of relative resistance variation of the material constituting the sensitive part of the bolometer in the vicinity of the operating temperature, conventionally close to −2% per K for the usual materials in this field (vanadium oxides, amorphous silicon). As a consequence, the relative resistance variation dR/R consequential upon a differential of 1 K on the scene is of the order of 0.04%, i.e. $4 \cdot 10^{-4}/K$.

Yet, the requirement today is for thermal resolutions of imaging much better than 1 K, and typically 0.05 K, or even less. Such results may be obtained by developing structures that have very high thermal resistances $R_{th}$ through the implementation of sophisticated techniques. However the need remains to measure minute relative resistance variations and typically, as previously indicated, of the order of a few $10^{-6}$, in order to resolve temperature variations in time and space of a few tens of milliKelvin.

Figure 1:
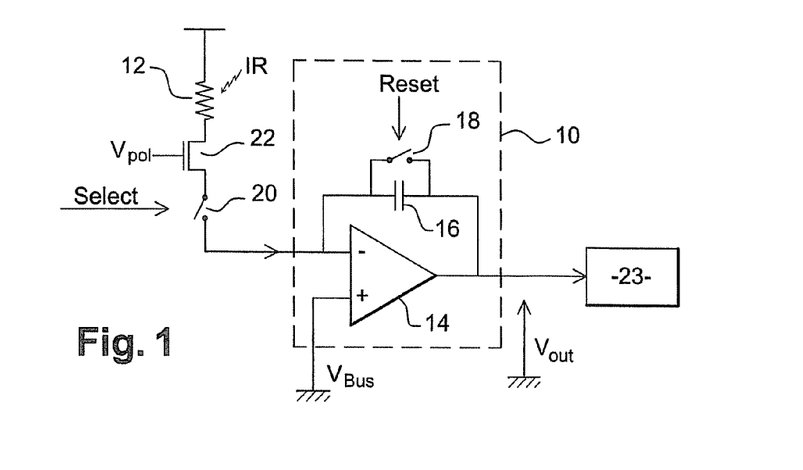
FIG. 1 is a diagrammatic view of a sensitive bolometer and of the read device thereof, as set forth in the prior art and discussed above.

To explain how difficult it is to exploit such a slight variation, a diagrammatic version has been shown in FIG. 1 of a read circuit of a resistive bolometer 12 of resistance $R_b$, subjected to an infrared radiation and connected at one of its terminals to a predetermined constant voltage. The read circuit includes an integrator 10 including:
an operational amplifier 14 whereof the noninverting input (+) is set to a predetermined constant voltage $V_{bus}$;
a capacitor 16, of predetermined capacity $C_{int}$, connected between the inverting input (−) of the amplifier 14 and the output thereof;
a reset switch 18 connected in parallel with the capacitor 16, and controllable by means of a "Reset" signal.
The read circuit further includes:
a first read switch 20, controllable by means of a "Select" signal and connected to the inverting input (−) of the operational amplifier 14;

an MOS injection transistor 22, whereof the gate is set at a predetermined constant voltage $V_{pol}$, whereof the source is connected to the other terminal of the bolometer 12, and whereof the drain is connected to the other terminal of the first selection switch 20; and an information processing unit 23, connected at the output of the operational amplifier 14, and determining as a function of the voltage $V_{out}$ at the output thereof the variation in the resistance of the bolometer 12 induced by the infrared radiation received by the latter, and thereby said infrared radiation.

At the start of a read cycle of the bolometer 12, the reset switch 18, which is closed subsequent to a discharge cycle of the capacitor 16, is opened by adjusting the "Reset" signal to an appropriate value. The first read switch 20, which is opened, is switched into the closed state by adjusting the "Select" signal. The current passing through the bolometer 12 is then integrated by the capacitor 16. When a predetermined integration time $\Delta T_{int}$ has elapsed from the start of the read cycle, the first read switch 20 is switched into its opened state. The voltage $V_{out}$, at the output of this integrator, image of the resistance $R_b$ of the bolometer, is then given by the expression:

$$V_{out} = \frac{V_{bolo}}{R_b} \times \frac{\Delta T_{int}}{C_{int}} + V_{bus} \tag{3}$$

where $V_{bolo}$ is the polarization voltage at the terminals of the bolometer 12 controlled by the voltage $V_{pol}$, assuming, in the interests of simplification, that $R_b$ varies little during the integration time $T_{int}$.

An array of N resistances (bolometers) could thus be read according to this principle by means of the simultaneous integration (using N integrators) or sequential integration (on an integrator placed at line end or column end, or even a single integrator for the array) of the currents coming from each resistance.

When the array so produced is illumined by the projection of an infrared scene, $V_{out}$, will show spatial variations (coming from each bolometer) representing the scene. It will be remembered that the voltage $V_{out}$, as previously expressed is very largely constituted by a constant part from one detector to the other, which is therefore of no advantage in terms of imaging.

Furthermore, through the existence of the thermal coupling between the substrate and the bolometer, the thermal variations sustained by the substrate are transferred to the bolometer. Since ordinary bolometers show very significant sensitivity to such variations, the result of this is that the output signal is disturbed by this parasitic background signal, which is detrimental to the quality of the detection of the infrared radiation.

The sum of these disturbances, contained in the signal $V_{out}$, is generally known as the "common mode" signal.

Lastly, to read a bolometer an electric current must be made to flow therein. In fact, the bolometer heats up by joule effect (this is generally known as "self-heating") further adding thereto a current component causing interference on the wanted signal related to the scene. Said self-heating $\Delta\theta(t)$, a function of the time, may be determined from the following differential equation:

$$C_{th} \times \frac{\partial \Delta\theta(t)}{\partial t} = \frac{V_{bolo}^2}{R_b(\theta(t))} - \frac{\Delta\theta(t)}{R_{th}}$$

where $C_{th}$, is the heat capacity of the sensitive membrane.

For a very short integration time $T_{int}$, of the order of a few tens of microseconds after the application of the voltage $V_{pol}$ at t=0, the heating may be considered as linear and given by the relation:

$$\Delta\theta = \frac{V_{bolo}^2}{C_{th} \times R_b(\theta(t=0))} T_{int}$$

It is then clear that, for typical values of $C_{th}$, $R_{th}$, $V_{bolo}$ and $T_{int}$, said temperature rise by self-heating typically reaches several degrees Kelvin. Thus, even very limited technological spatial variations of $C_{th}$ or $R_b$, of the order of 1% for example, are conveyed by spatial temperature variations of each membrane at the end of the integration time of the order of 20 mK for an electrical heating $\Delta\theta$ of 2°, in other words of the same order as the heating caused by a scene temperature increase of 1 K.

These dispersions thus also come to disturb the representativity of the signal $V_{out}$ relative to the variations in space and time of radiative power, alone representative of the scene observed, and which constitute the wanted signal.

To overcome these drawbacks, a so-called "reference" resistive structure has been proposed as described in the document "*Performance of 320×240 Uncooled Bolometer-type Infrared Focal Plane Arrays*" by Yutaka Tanake et al., Proc. SPIE, vol 5074.

The principle of a reference resistive structure is to associate, with the resistive bolometer 12 in FIG. 1, an identical second resistive bolometer, polarized and connected to the substrate in an identical way to the first bolometer. Said second bolometer is further arranged so as to be essentially insensitive to the flux coming from the scene, typically via an opaque metal membrane, or placed in an area not illumined by the scene. The first and second resistive bolometers are furthermore associated in such a way that the current passing through the second bolometer is subtracted from the current passing through the first bolometer and that it is this current difference which is used by the read circuit.

To distinguish between the functions of these two bolometers, the expression "imaging" bolometer will be used for the first bolometer, and the expression "reference" bolometer for the second bolometer, even if in some uses, in thermometry for example, it is not necessarily an image that is formed, but for example a temperature measurement.

Figure 2:
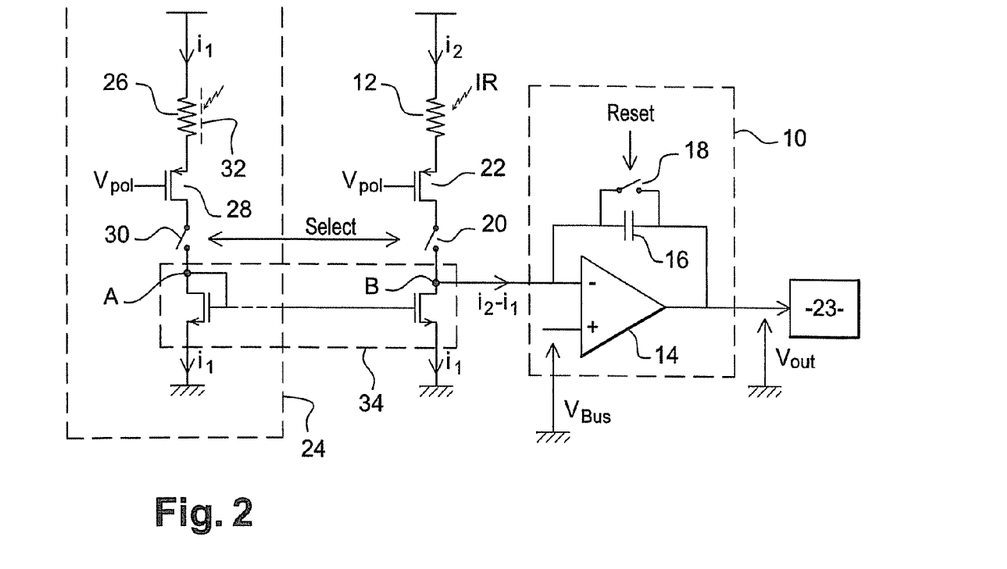
FIG. 2 is a diagrammatic view completing FIG. 1 with common mode compensation using a reference resistive structure as set forth in the prior art and associated circuitry elements, as discussed above.

A reference structure 24 is diagrammatically shown in FIG. 2, which repeats the elements in FIG. 1, with which a so-called "reference" circuit 24 is associated. The reference circuit 24 includes a reference bolometer 26, an MOS polarization transistor 28 and a second read switch 30, substantially identical to the imaging bolometer 12, the MOS injection transistor 22 and the first read switch 20 respectively.

The elements 26, 28 and 30 are moreover polarized and arranged in the same manner as the elements 12, 22 and 20, the only difference being that the reference bolometer 26 is for example provided with an opaque metal membrane 32 that protects it from the radiation coming from the scene or is placed in an area not illumined by the scene.

The reference resistive structure finally comprises a current mirror 34, whereof one input branch is connected to a terminal A of the second read switch 30, and whereof the other input branch is connected to a terminal B of the first read switch 20. Said current mirror 34 substantially reproduces the current $i_1$ passing through the reference bolometer 26 at the terminal B.

The employment of current mirrors means that only one single reference structure is needed per line, all of said structures being placed in accordance with one reference "column" for one matrix detector. Current mirrors are structures known to the person skilled in the art. Generally speaking they allow a reference current to be copied in a remote structure, and in particular allow said reference current to be distributed in a multitude of circuitry elements, irrespective of the resistive load thereof.

Thus, the current $i_1$ passing through the reference bolometer is substantially equal to the common mode current, and the reference bolometer is subject to the same thermal variations coming from the substrate as the imaging bolometer. The difference $i_2-i_1$ between the current $i_2$ passing through the imaging bolometer and the current $i_1$ passing through the reference bolometer is then substantially free from the disturbances constituted by the common mode current and the component related to the thermal variations of the substrate, at least so long as the substrate is essentially isothermal. This current difference $i_2-i_1$ therefore corresponds substantially to the current induced by the resistance variation of the imaging bolometer 12 on account of its being heated by the infrared radiation coining from the scene.

Conventionally, there are two layouts that use reference bolometers.

Figure 3:
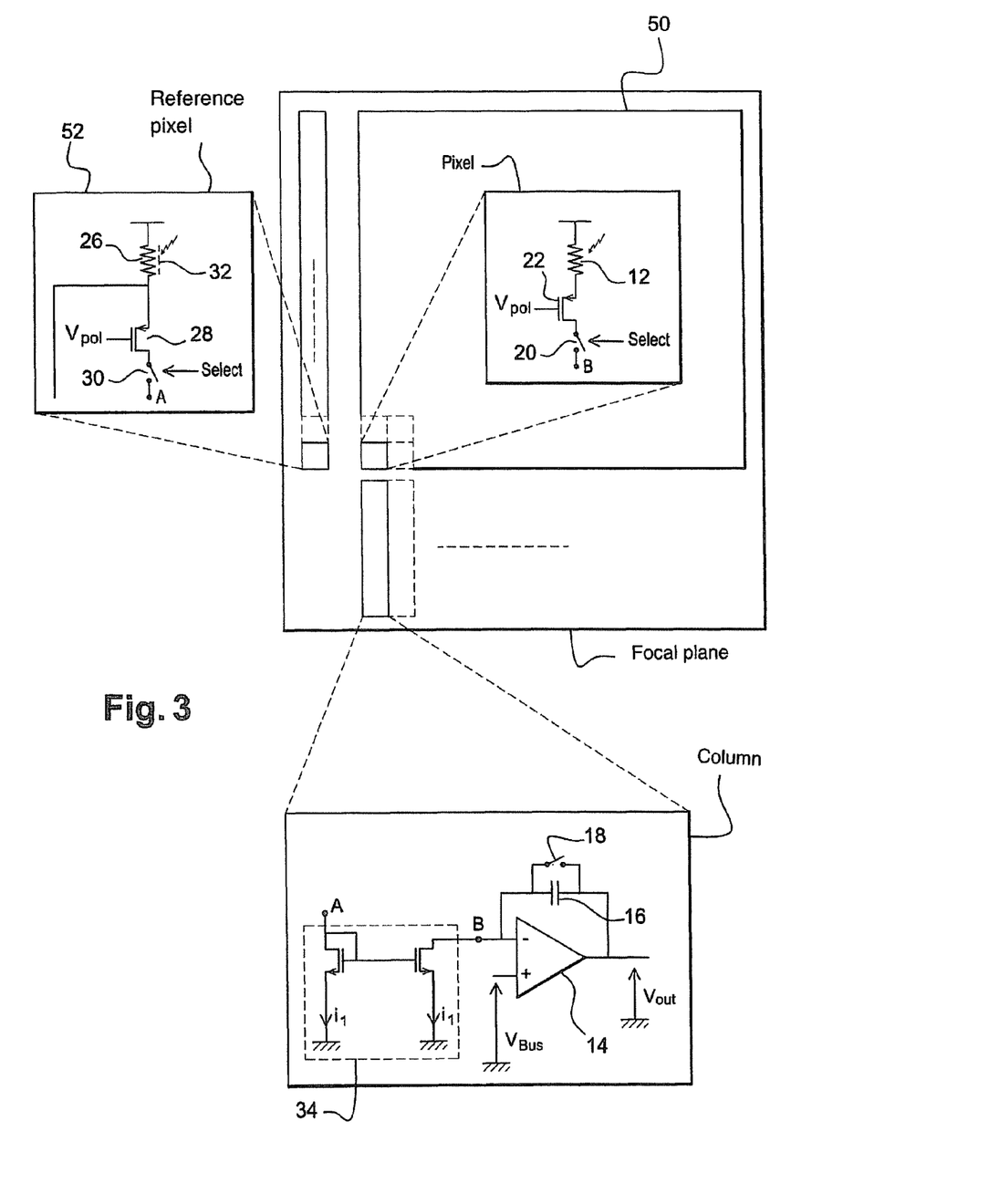
FIGS. 3 and 4 are diagrammatic views of possible layouts of reference resistive structures in a bolometric detector as set forth in the prior art and as discussed above.

In a first layout shown in FIG. 3, a reference bolometer 26 is provided for each line in an array 50 of imaging bolometers and therefore supplies, via the current mirror 34, a so-called "reference" current for all the imaging bolometers in the line. The self-heating phenomena of said imaging bolometers 12 are thus compensated since the reference bolometer 26 is subject to the same polarization cycles as the imaging bolometers 12 in the associated line. On the other hand, providing a reference bolometer 26 for each line in the array of imaging bolometers generates an on-line spatial noise given the technological dispersions of the reference bolometers.

Figure 4:
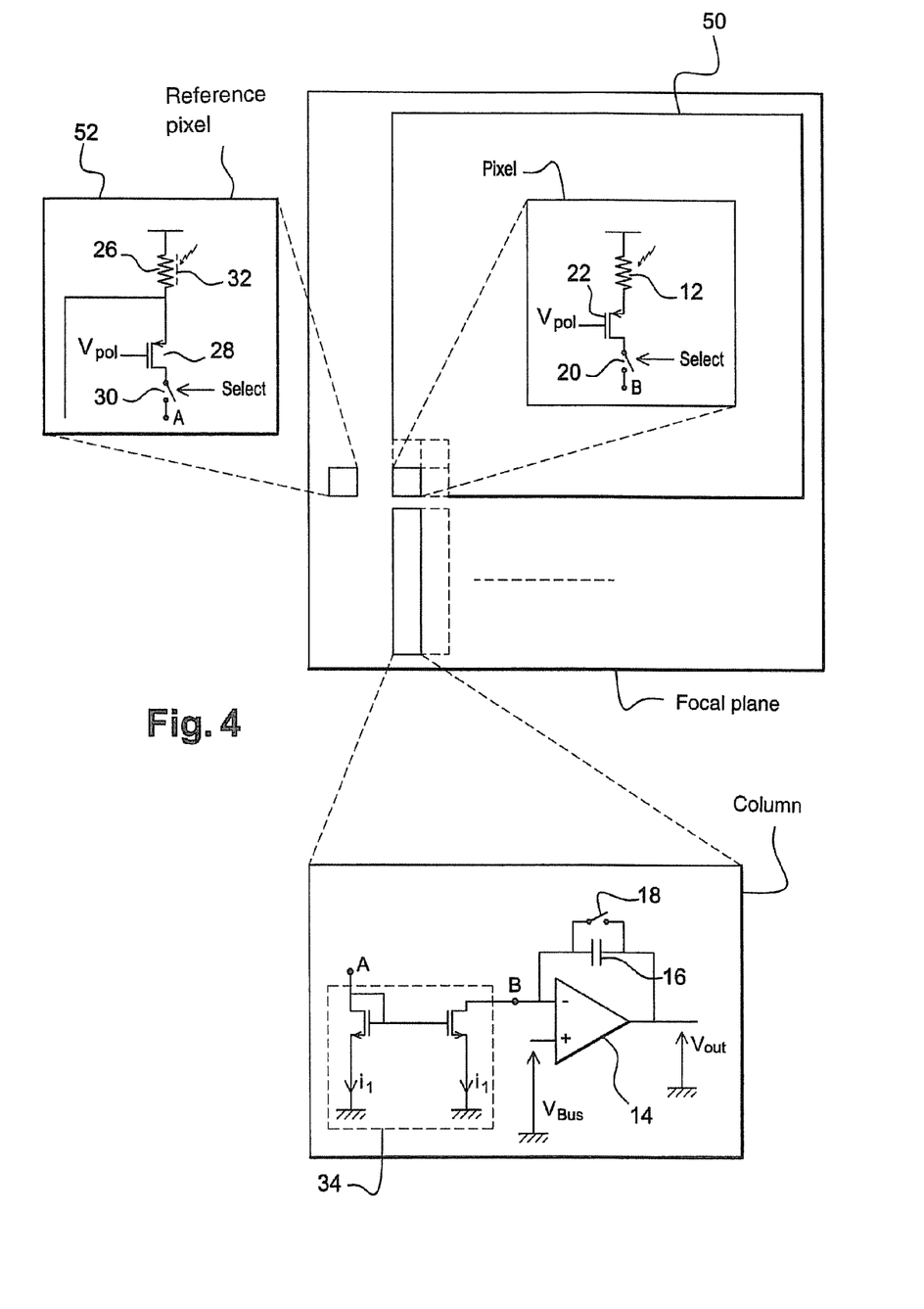

In a second layout shown in FIG. 4, a single reference bolometer 26 is provided for all the imaging bolometers in the array 50. The current coming therefrom is then copied by a set of current mirrors 34. The spatial noise generated by the technological dispersions is thus avoided. However, the thermal cycle of said single reference bolometer 26 is substantially different from that of the imaging bolometers 12. Indeed, unlike an imaging bolometer which is polarized when its line is being read, the reference bolometer 26 is polarized at each line reading. The thermal time constant of the reference bolometer $R_{th} \times C_{th}$, of the order of a few milliseconds, does not allow it to return to its equilibrium temperature prior to each read (integration) cycle. As a result, the self-heating of the reference bolometer 26 differs substantially from the self-heating of the imaging bolometers 12, in such a way that the rejection of this component is of very poor quality.

It should be noted that the higher the level of insulation of the membranes of the imaging bolometers 12 the more pronounced are the self-heating phenomena, which is the case in top-of-the-range detectors, in respect of which efforts are made to maximize $R_{th}$ in order to maximize sensitivity, which also leads to reducing $C_{th}$ in order to maintain a thermal time constant that is compatible with imaging frame frequency standards. Because of this, the heating after each reading is greater for similar stimuli, and finally the residual temperature rise at the start of the next cycle is all the more sensitive.

The more sensitive the detector the trickier therefore the common mode current rejection, which in the end limits the improvements in performance that it is possible to make to these detectors.

Furthermore, a reference resistive structure is technically difficult to produce. Indeed, to obtain a satisfactory operation thereof, it is necessary for the metal membrane 26 protecting the reference bolometer to be totally impermeable to the flux coming from the scene, while being thermally insulated from the other elements in the structure in order to avoid any thermal disturbance on the reference bolometer. Such a membrane is difficult to design and to produce. Additionally, the substantial increase in complexity involved in developing such a membrane necessarily entails an additional cost, given additional manufacturing stages and therefore a non ideal production performance. The same is true when the reference bolometer is placed in an area not illumined by the scene since this compels the provision of sufficient space on the surface of the read circuit substrate, in addition generally to an opaque screen added to the inside of the casing. The overall result is a higher detector cost.

In fact for detectors not requiring great precision, the reference bolometer is conventionally replaced by a so-called "compensation" bolometer, in other words a bolometer that has no optical occultation membrane. Such a compensation bolometer is generally thermalized in the substrate, in other words it has no attachment arms or is partially or totally formed in direct contact with the substrate in order to create a thermal short-circuit between the compensation bolometer and the substrate. The compensation bolometer therefore sustains essentially the same heating as the substrate. The common mode rejection then essentially comprises only the rejection of the signal part corresponding to the temperature of the substrate transferred to the imaging bolometers. The result is a common mode rejection of limited quality.

SUMMARY OF THE INVENTION

The purpose of the present invention is to resolve the abovementioned problem by putting forward, in a bolometric detector, a common mode rejection structure which accurately evaluates and compensates for the phenomena of current increase through self-heating sustained by the imaging bolometers, without however involving a substantial increase in the complexity of the detector manufacturing processes.

To this end, the object of the invention is a device for the detection of an electromagnetic radiation that includes:
  a substrate;
  an imaging bolometer, comprising a bolometric membrane suspended above the substrate;
  a circuit for polarizing the imaging bolometer and capable of polarizing it at a predetermined polarization voltage;
  a rejection circuit capable of generating a common mode current, the rejection circuit comprising a compensation bolometer thermalized in the substrate and a circuit for polarizing the compensation bolometer; and
  a measurement circuit capable of being connected to the imaging bolometer and to the rejection circuit in order to measure the difference between the current flowing in the imaging bolometer when it is polarized and the common mode current generated by the rejection current.

According to the invention, the rejection circuit further comprises a current generator capable of producing a current that simulates the current induced by the self-heating of the imaging bolometer under the effect of its polarization, the sum of the current passing through the compensation bolometer and the current generated by the current generator forming the common mode current.

In other words, with a conventional compensation bolometer, thermalized in the substrate, is associated a current generator which estimates the increase in current induced by the self-heating of the imaging bolometer. The sum of the currents coining from the compensation bolometer and from the generator is then equivalent to the current that would be produced by a reference bolometer that is subjected to the same self-heating cycles as the imaging bolometer. Moreover, to achieve such a result, no optical occultation membrane is required, nor is the rejection of the compensation bolometer in an area not illuminated by the scene, since the precision of the common mode rejection is associated with the design of the current generator whereof the design and manufacture are more straightforward than the design and manufacture of an optical occultation membrane generally present in a reference bolometer, or not restrictive in terms of space to be kept on the read circuit and occultation parts to be provided.

According to one embodiment of the invention, the current generator is capable of producing a current Δi based on a model of the current induced by self-heating according to the relation:

$$\Delta i(t) = \frac{|TCR| \times V_{bolo}^3}{C_{th} \times R_b^2} \times t$$

where t is the time elapsed since the start of the application of polarization, TCR is the temperature coefficient of resistance variation of the imaging bolometer, $C_{th}$ is the thermal capacity of the imaging bolometer, $R_b$ is the resistance of the imaging bolometer with no self-heating, and $V_{bolo}$ is the voltage at the terminals of the imaging bolometer.

In other words, as will become clear below, the current generator is based on a first order approximation of the differential equations modeling the behavior of an imaging bolometer subjected to different energy contributors when it is polarized. Said first order approximation, which accepts the proportionality of the heating with the polarization time, is pertinent in so far as the integration times are very short, generally of the order of a few tens of microseconds, and the temperature variations sustained during these periods by the imaging bolometer are slight. A current generator is thus obtained which is based on a relation whereof the implementation is simplified.

To be more specific, the current generator comprises:
a current generation module including:
  a first resistance;
  a circuit for polarizing the first resistance capable of polarizing it in accordance with a drive voltage received on an input terminal;
  a capacitor connected to the first resistance so as to be charged by the current passing through said resistance;
  a switch for resetting the capacitor charge to zero;
  a second resistance; and
  a circuit for polarizing the second resistance, capable of polarizing it in accordance with the voltage at the terminals of the capacitor received on an input terminal, the current passing through the second resistance forming the output current of the current generator,
and a voltage generator, denoted hereinafter "voltage module", generating a voltage for driving the polarization circuit of the first resistance as a function of the TCR and the polarization voltage $V_{pol}$ of the imaging bolometer.

In other words, the current generator consists of an analog circuit that simulates the self-heating of the imaging bolometer driven by a voltage generator module taking account of the operating parameters of the imaging bolometer constituted by its temperature coefficient of resistance variation and its polarization voltage.

To advantage, the first and second resistances are bolometers thermalized in the substrate that have a temperature coefficient of resistance variation similar to that of the imaging bolometer. The value of the resistances thus changes in a manner similar to that of the imaging bolometer (apart from self-heating) as a function of the temperature.

To advantage, the imaging bolometer is of the semi-conductor type, and the voltage module is capable of generating a drive voltage in accordance with the relation:

$$V_1 = \frac{V_{bolo}^3 \times E_a}{K \times \theta^2}$$

where $V_1$ is the drive voltage, $E_a$ is a predetermined activation energy of the imaging bolometer, K is the Boltzmann constant, and θ is a measured or estimated temperature of the imaging bolometer.

It should be noted that the identity of the terms in the relation expressing the quantity $V_1$ is taken as being solely in the digital field, since the dimensional identity does not exist between the two terms of said relation. This observation also applies to the relations expressing the quantity $V_1$ disclosed below.

In other words, as will be made clear below, the temperature coefficient of resistance variation is evaluated as a function of an Arrhenius temperature behavior model of the imaging bolometer, in accordance with which the resistance $R_b$ is expressed in the form $$R_b(\theta(t)) = R_0 \times e^{\frac{E_a}{K \times \theta(t)}}$$

According to another inventive embodiment, the imaging bolometer is of the semi-conductor type, the value of the first and second resistances is substantially the limit resistance at infinite temperature of the imaging bolometer, and the voltage module is capable of generating a drive voltage in accordance with the relation:

$$V_1 = \frac{V_{bolo}^3 \times E_a}{K \times \theta^2} \times e^{\frac{-2 \times E_a}{K \times \theta}}$$

where $V_1$ is the drive voltage, $E_a$ is a predetermined activation energy of the imaging bolometer, K is the Boltzmann constant, and θ is a measured or estimated temperature of the imaging bolometer.

In other words, the temperature coefficient of resistance variation is evaluated as a function of an Arrhenius temperature behavior model of the imaging bolometer and the voltage module reproduces said model.

According to one inventive embodiment, the temperature θ is a measurement of the temperature of the substrate. In other words, the temperature of the imaging bolometer is estimated, in respect of evaluating the current induced by self-heating, as substantially equal to that of the substrate, which is the first order situation.

Another object of the invention is a bolometric detector that comprises a substrate, an array of electromagnetic radiation imaging bolometers, each of the imaging bolometers comprising a membrane suspended above the substrate and each of the imaging bolometers being associated with:

a polarization circuit capable of polarizing said bolometer at a predetermined polarization voltage;

a rejection circuit capable of generating a common mode current, the rejection circuit comprising a compensation bolometer thermalized in the substrate and a circuit for polarizing the compensation bolometer;

and a measuring circuit capable of measuring the difference between the current flowing in the bolometer when it is polarized and the common mode current generated by the rejection circuit, According to the invention, the rejection circuit is of the aforementioned type.

In other words, the association of an imaging bolometer, a compensation bolometer and a current generator of the aforementioned type, is of particular use in bolometric matrix detectors.

According to one embodiment of the detector, each column of imaging bolometers in the array is associated with a single rejection circuit.

According to another embodiment of the detector, it includes a single rejection circuit, together with a current mirror associated with each column of imaging bolometers in the array in order to copy the current delivered by the rejection circuit.

BRIEF DESCRIPTION OF THE DRAWINGS

The invention will be better understood from reading the following description, given solely by way of example, and produced in relation to the appended drawings, wherein identical references refer to identical or similar elements, and wherein.

DETAILED DESCRIPTION OF THE INVENTION

Figure 5:
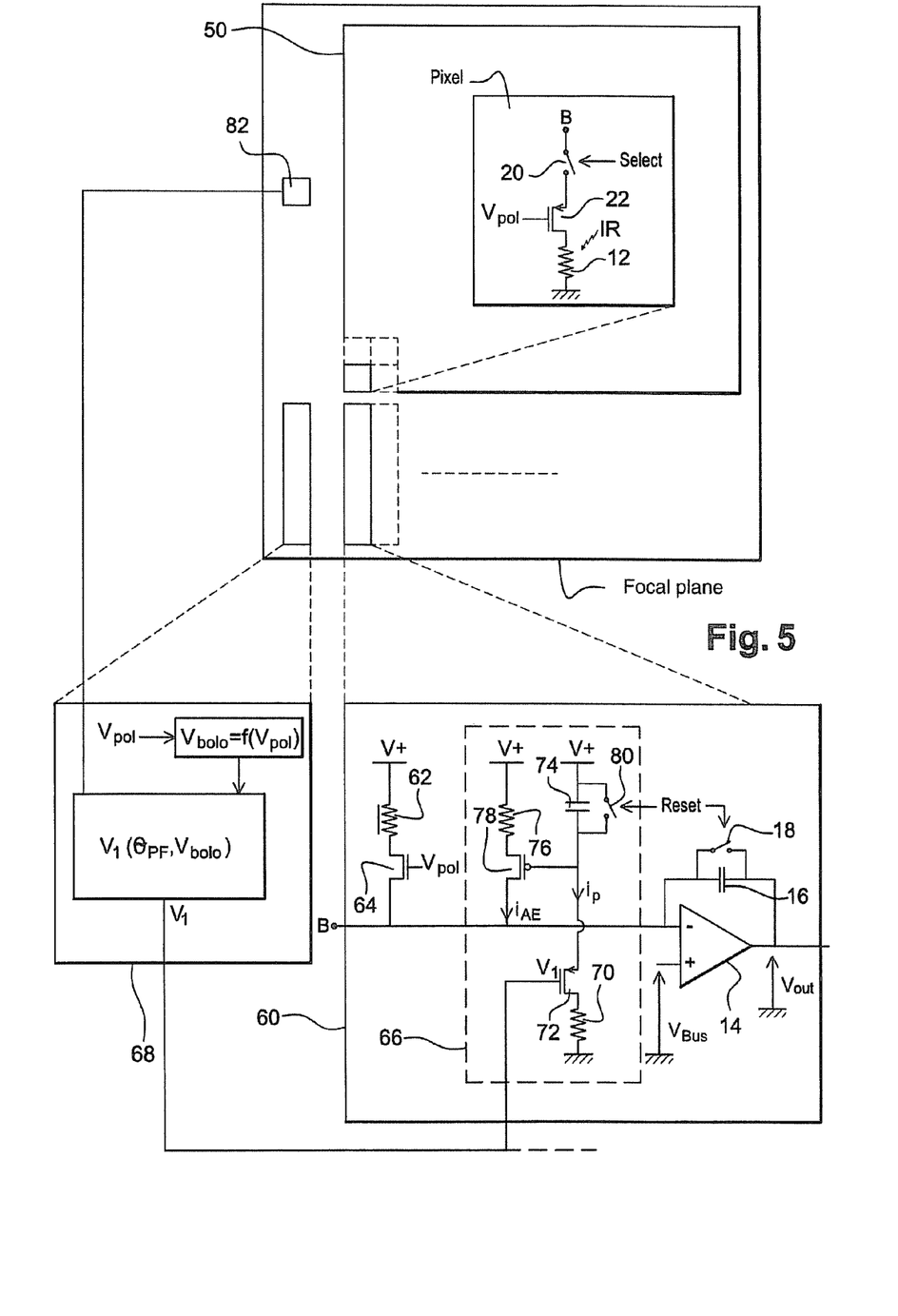
FIG. 5 is a diagrammatic view of a preferred embodiment of an inventive bolometric detector.

An inventive bolometric detector is shown in FIG. 5. As has already been previously described in relation to FIGS. 2 to 4, the detector comprises an array of bolometric pixels 50, each of the pixels comprising an imaging bolometer 12 that has a bolometric membrane sensitive to infrared radiation and suspended above a substrate by means of support and thermal insulation arms. The bolometric membrane is of the semiconductor type, and comprises amorphous silicon or vanadium oxides for example.

Each pixel in the array 50 also comprises an MOS transistor 22 and a read switch 20. Each column in the array 50 is associated with a read circuitry 60 produced in the substrate.

The circuitry 60 comprises an integrator, constituted by an operational amplifier 14, a capacitor 16 and a reset switch 18.

The circuitry 60 also comprises a compensation bolometer 62 thermalized in the substrate. For example the compensation bolometer 62 has no support arms and/or is partially or totally formed in direct contact with the substrate so as to create a thermal short-circuit between the compensation bolometer and the substrate. An MOS polarization transistor 64 is furthermore provided to polarize the compensation bolometer 62, the transistor 64 being furthermore connected to a node B to which is connected the read switch 20 of each pixel of the column of the array 50.

The read circuitry 60 further comprises an analog module 66 producing a current $i_{AE}$ that is linearly time-dependent and driven by means of a voltage $V_1$ supplied by a voltage module 68, arranged in the substrate or external thereto.

The analog module 66 comprises a first resistance 70, a first MOS transistor 72 for polarizing the resistance 70 driven by the voltage $V_1$, a capacitor 74 connected in series with the first MOS transistor 72 and the first resistance 70, a second resistance 76, a second MOS transistor 78 for polarizing the second resistance 76, driven by the voltage at the terminals of the capacitor 74. A switch 80, driven by the "Reset" signal is furthermore provided to discharge the capacitor 74 prior to each read cycle of an imaging bolometer.

Thus, after initializing the capacitor 74 by the momentary closure of the switch 80, and by applying the voltage $V_1$ to the first polarization MOS 72, the voltage $V_1$ is applied to the terminals of the first resistance 70 (near to the threshold voltage of the MOS transistor 72 which is ignored here in the interests of simplifying the expressions). The current $i_p$ passing through the first resistance 70 then charges the capacitor 74 at constant current. The voltage $V_2$ at the terminals of the capacitor 74 then takes the form:

$$V_2(t) = -\frac{V_1}{C \times R_1} \times t \tag{1}$$

where C is the value of the capacity of the capacitor 74, $R_1$ is the value of the first resistance 70, and considering the origin of the time t at the initial instant of the application of the voltage $V_1$ to the MOS transistor 72.

The current $i_{AE}$ flowing in the second resistance 76 and coming to be added to the current flowing in the compensation bolometer 62 is then equal to:

$$i_{AE}(t) = -\frac{V_1}{C \times R_1 \times R_2} \times t \tag{2}$$

where $R_2$ is the value of the second resistance 76.

The voltage module 68 is for its part connected to a temperature sensor 82, arranged in the substrate and measuring the temperature thereof, and to the polarization voltage $V_{pol}$ applied to the gates of the polarization transistors 22 of the imaging bolometers 12, on the basis of which the module 68 estimates the voltage $V_{bolo}$ present at the terminals of the imaging bolometer 12 in accordance with the given design of the circuit.

First Alternative

In a first inventive alternative, the voltage module 68 produces the voltage $V_1$ in accordance with the relation:

$$V_1 = \frac{V_{bolo}^3 \times E_a}{K \times \theta^2} \quad (3)$$

where:

$E_a$ is a predetermined activation energy of the imaging bolometer;

K is the Boltzmann constant; and

θ is the temperature measured by the sensor 82.

In this first alternative too, the capacity C of the capacitor 74 and the values $R_1$ and $R_2$ of the first and second resistances 70, 76 are selected in such a way that the product $R_1 \times R_2 \times C$ is substantially equal to the product $C_{th} \times R_b^2 \cdot R_b$ is understood here in the absence of self-heating.

The first and second resistances 70, 76 are in this first alternative bolometers thermalized in the substrate of the semi-conductor type and therefore have the same temperature coefficient of resistance variation as imaging bolometers 12.

The current $i_{AE}$ delivered by the module 66 is then equal to:

$$i_{AE}(t) = \frac{E_A \times V_{bolo}^3}{K \times \theta^2 \times C_{th} \times R_b^2} \times t \quad (4)$$

It will be noted that the current $i_{AE}$ so produced is a first degree approximation of a physical model of the current induced by the self-heating of imaging bolometers 12 thermally insulated from the substrate.

It is shown indeed that the temperature of an imaging bolometer 12 polarized at the voltage $V_{bolo}$ can be modeled in accordance with the relation:

$$C_{th} \times \frac{\partial \Delta \theta(t)}{\partial t} = \frac{V_{bolo}^2}{R_b(\theta(t))} - \frac{\Delta \theta(t)}{R_{th}} \quad (5)$$

where $\partial$ is the partial derivative symbol and $\Delta\theta(t)$ is the difference between the temperature of the imaging bolometer and the temperature of the substrate.

In fact, the integration time during which the imaging bolometer 12 is polarized for its reading is very short, of the order of a few tens of microseconds. The resistance variation of the bolometer during this period of time is very slight so that the relation (5) is equal in the first order to:

$$C_{th} \times \frac{\partial \Delta \theta(t)}{\partial t} = \frac{V_{bolo}^2}{R_b(\theta(t))} \quad (6)$$

Furthermore, the resistance of an imaging bolometer of the semi-conductor type can be modeled in accordance with the following relation, known as the law of "Arrhenius":

$$R_b(\theta(t)) = R_0 \times e^{\frac{E_a}{K \times \theta(t)}} \quad (7)$$

where $R_0$ is the limit resistance at infinite temperature of the imaging bolometer. The TCR or temperature coefficient of relative variation of resistance is expressed in accordance with the relation:

$$TCR = -\frac{E_a}{K \times \theta^2(t)} \quad (8)$$

By combining the relations (6) and (7), by applying ohm's law, and by using first order approximation according to which the self-heating is proportionate to the time, the following expression is obtained of the current induced by the self-heating of the imaging bolometer:

$$\Delta i(t) = \frac{|TCR| \times V_{bolo}^3}{C_{th} \times R_b^2} \times t \quad (9)$$

The current $i_{AE}$ produced by the module 66 is therefore based to advantage on the first order approximation of the relation (9) on the assumption that the relation between the temperature and the resistance of an imaging bolometer is of the type in accordance with the relation (6) and that the temperature of said bolometer is equal, in the first order, to that of the substrate.

Second Alternative

In a second alternative, the values R1 and R2 of the resistances 70 and 76 are selected substantially equal to the limit resistance at infinite temperature $R_0$ of the imaging bolometers 12 and the value C of the capacitor 74 is selected in such a way that the product $R_1 \times R_2 \times C$ is substantially equal to the product $C_{th} \times R_0^2$ of the imaging bolometers 12.

In this alternative, the drive voltage $V_1$ produced by the voltage module is equal to:

$$V_1 = \frac{V_{bolo}^3 \times E_a}{K \times \theta^2} \times e^{\frac{-2 \times E_a}{K \times \theta}} \quad (10)$$

The current $i_{AE}$ produced by the module 66 is then equal to:

$$i_{AE}(t) = \frac{E_a \times V_{bolo}^3}{K \times \theta^2 \times C_{th} \times \left(R_0 \times e^{\frac{E_a}{K \times \theta}}\right)^2} \times t \quad (11)$$

The current so produced in accordance with the relation (11) also constitutes a first order approximation that is based on the relation (9) on the assumption that the relation between the temperature and the resistance of an imaging bolometer is of the type in accordance with the relation (7) and that the temperature of said bolometer is equal, in the first order, to that of the substrate. Unlike the current produced in accordance with the relation (4), the changes in the resistance as a function of the temperature are simulated in this case by associating the resistances 70 and 76 of constant values and equal to the limit value $R_0$, and the value of the voltage $V_1$ which comprises the exponential term.

The first alternative is preferred when a high level of precision is required, since temperature changes in the resistance induced by the self-heating are produced by resistances similar to the imaging bolometers.

The second alternative is for its part preferred when a straightforward design of the read circuitry is preferred, in so far as conventional resistances are used.

Common mode rejection is thus implemented both by the compensation bolometer 62, the effect of which is to reject the common mode portion corresponding to the temperature of the substrate, and by the association of the voltage module 68 and the current module 66, which together produce a current the effect of which is to reject the common mode portion corresponding to the self-heating of the imaging bolometers 12 when they are read. An ideal reference bolometer is thus simulated.

An embodiment has been described in which the common mode rejection circuit comprises a current generator, formed by associating the modules 66 and 68, present at the end of each column of the array 50.

As an alternative, a single current generator of this type is provided and the current produced thereby is copied for each column by means of current mirrors.

An embodiment has also been described in which the current is produced based on the relation (7) describing changes in the resistance of a bolometer of the semi-conductor type as a function of its temperature.

The invention claimed is:

1. A device for the detection of an electromagnetic radiation including:
   a substrate;
   a resistive imaging bolometer comprising a bolometric membrane suspended above the substrate;
   a circuit for polarizing the imaging bolometer and capable of polarizing it at a predetermined polarization voltage;
   a rejection circuit capable of generating a common mode current, the rejection circuit comprising a compensation bolometer thermalized in the substrate and a circuit for polarizing the compensation bolometer; and
   a measuring circuit capable of being connected to the imaging bolometer and to the rejection circuit in order to measure the difference between the current flowing in the imaging bolometer when it is polarized and the common mode current generated by the rejection circuit,
   wherein the rejection circuit further comprises a current generator capable of producing a current that simulates the current induced by the self-heating of the imaging bolometer under the effect of its polarization, the sum of the current passing through the compensation bolometer and the current generated by the current generator forming the common mode current.

2. The device for the detection of an electromagnetic radiation as claimed in claim 1, wherein the current generator is capable of producing a current based on a model of the current induced by the self-heating in accordance with the relation:

$$\Delta i(t) = \frac{|TCR| \times V_{bolo}^3}{C_{th} \times R_b^2} t$$

where $\Delta i$ is the variation in the current induced by the self-heating during a period of time $t$, TCR is the temperature coefficient of resistance variation of the imaging bolometer, $C_{th}$ is the thermal capacity of the imaging bolometer, $R_b$ is the resistance of the imaging bolometer, and $V_{bolo}$ is the voltage at the terminals of the imaging bolometer.

3. The device for the detection of an electromagnetic radiation as claimed in claim 2, wherein the current generator comprises:
   a current generation module including:
      a first resistance;
      a circuit for polarizing the first resistance capable of polarizing it according to a drive voltage ($V_1$) received on an input terminal;
      a capacitor connected to the first resistance so as to be charged by the current passing through said resistance;
      a switch for resetting the charge of the capacitor;
      a second resistance; and
      a circuit for polarizing the second resistance capable of polarizing it according to the voltage at the terminals of the capacitor, the current passing through the second resistance forming the output current of the current generator; and
   a voltage module generating a drive voltage ($V_1$) of the circuit for polarizing the first resistance as a function of the TCR and of the polarization voltage $V_{pol}$ of the imaging bolometer.

4. The device for the detection of an electromagnetic radiation as claimed in claim 3, wherein the first and second resistances are bolometers thermalized in the substrate and have a temperature coefficient of resistance variation similar to that of the imaging bolometer.

5. The device for the detection of an electromagnetic radiation as claimed in claim 3, wherein the imaging bolometer is of the semi-conductor type, and wherein the drive module is capable of generating a drive voltage in accordance with the relation:

$$V_1 = \frac{V_{bolo}^3 \times E_a}{K \times \theta^2}$$

where $V_1$ is the drive voltage, $E_a$ is a predetermined activation energy of the imaging bolometer, K is the Boltzmann constant, and $\theta$ is a measured or estimated temperature of the imaging bolometer.

6. The device for the detection of an electromagnetic radiation as claimed in claim 3, wherein the product of the resistances of the first and second resistances and of the capacity of the capacitor is substantially equal to the product $C_{th} \times R_b^2$, where $C_{th}$ and $R_b$ are the thermal capacity and electrical resistance respectively of the imaging bolometer.

7. The device for the detection of an electromagnetic radiation as claimed in claim 3, wherein the imaging bolometer is of the semi-conductor type, wherein the value of the first and second resistances is substantially the limit resistance at infinite temperature $R_0$ of the imaging bolometer, and wherein the drive module is capable of generating a drive voltage in accordance with the relation:

$$V_1 = \frac{V_{bolo}^3 \times E_a}{K \times \theta^2} \times e^{\frac{-2 \times E_a}{K \times \theta}}$$

where $V_1$ is the drive voltage, $E_a$ is a predetermined activation energy of the imaging bolometer, K is the Boltzmann constant, and $\theta$ is a measured or estimated temperature of the imaging bolometer.

8. The device for the detection of an electromagnetic radiation as claimed in claim 7, wherein the product of the resistances of the first and second resistances and of the capacity of the capacitor is substantially equal to the product $C_{th} \times R_0^2$ where $C_{th}$ and $R_0$ are the thermal capacity and the electrical resistance at infinite temperature respectively of the imaging bolometer.

9. The device for the detection of an electromagnetic radiation as claimed in claim 5, wherein the temperature $\theta$ is a measurement of the temperature of the substrate.

10. A bolometric detector comprising an array of electromagnetic radiation imaging bolometers, the bolometric detector comprising, associated with each of the imaging bolometers, the device for the detection of an electromagnetic radiation as claimed in claim 1.

11. The detector as claimed in claim 10, wherein each column of imaging bolometers in the array is associated with a single rejection circuit.

12. The detector as claimed in claim 10, further comprising a single rejection circuit and a current mirror associated with each column of imaging bolometers in the array in order to copy the current delivered by the rejection circuit.

* * * * *